UNITED STATES PATENT OFFICE.

CHARLES WILLIAM SIEMENS, OF WESTMINSTER, GREAT BRITAIN, AND FREDERIC SIEMENS, OF BERLIN, PRUSSIA.

IMPROVED GAS PRODUCER OR FURNACE.

Specification forming part of Letters Patent No. 42,717, dated May 10, 1864.

*To all whom it may concern:*

Be it known that we, CHARLES WILLIAM SIEMENS, a resident of Westminster, Great Britain, and FREDERIC SIEMENS, a resident of Berlin, in the Kingdom of Prussia, have invented a new and useful or Improved Gas Producer or Furnace; and we do hereby declare the same to be fully described in the following specification, and represented in the accompanying drawing, which denotes a longitudinal section of the said gas-producer.

The invention is designed to be used in connection with what we term our "regenerative gas-furnace," Letters Patent on which have been granted to us in Great Britain, bearing date the 22d day of January, A. D. 1861, and are numbered 167 for that year. For the said regenerative gas furnace we have also applied for a patent in the United States of America.

The object or purpose of our present invention is to prepare from fuel or various other bodies or matters capable of producing it a combustible gas, such as may be used to advantage in the said regenerative furnace. The furnace in question has a fuel-chamber whose back, B, may be composed of fire-brick, supported on a metallic plate, and be set at an inclination of from forty-five to sixty degrees to the horizon. Below the said back there is an inclined grate, C, formed with a series of flat steps with passages between them. At the foot of the grate is a covered water-trough, D, provided with a slot or opening, I, out of its front side and just below the cover. This trough, when in use, is to be supplied with water, which may be maintained at a constant level within it by any suitable means. We generally employ a reservoir communicating with the said trough by means of a pipe and having a ball-tap, a float, and valve, for regulating the flow of water into the reservoir and maintaining the water in it at a constant level. There is an opening, L, below the water-trough and leading into an open space or chamber, M, arranged in rear of the inclined back B, the said opening L being convenient for enabling clinkers to be withdrawn through it from the furnace, as they generally collect in front of the opening.

Directly over the inclined back B the furnace is provided with a mouth and throat, as shown at A, the mouth being furnished with a smaller cover, *a*. Furthermore, at the crown of the furnace, as well as at its rear, there are openings G F for the introduction of a poker or iron bar, which may be occasionally used to break or stir up a mass of fuel within the furnace as well as to detach clinkers from the side walls thereof. An opening, H, through the front wall of the furnace leads into an arched passage, P, through which the gas produced by the furnace is led to the regenerative gas-furnace to be used therein.

In the use of our invention the fuel, which may be of the poorest description—such as slack, coke-dust, lignite, or peat—is to be supplied to it at intervals of several hours through the mouth and throat A, such fuel as it may be consumed being caused to gradually descend the inclined plane B and the grate C, the fuel on the grate being on fire or in a state of combustion. As the fuel descends it becomes heated and parts with its volatile constituents, the hydrocarbon gases, water, ammonia, and some carbonic acid, which are the same as would be evolved from it when heated in a common gas-retort. After this there will remain a large amount of purely carbonaceous matter to be disposed of, which will be accomplished by the slow currents of air which will pass through the grate C and into the furnace, and will produce regular combustion immediately upon the grate. The carbonic acid thereby produced having to pass slowly on through a layer of incandescent fuel, (which, generally speaking, will not be far from three or four feet in thickness,) will take up a portion of carbon and the carbonic acid thus formed will pass off with the other combustible gases which escape from the producer. For every cubic foot of combustible carbonic oxide thus produced, taking the atmosphere to consist of one-fifth part by volume of oxygen and four-fifths of nitrogen, two cubic feet of incombustible nitrogen will pass also through the grate, the same greatly tending to diminish the richness or heating power of the gas. Not all the carbonaceous portion of the fuel is, however, volatilized on such disadvantageous terms, for the water-trough D, at the foot of grate, absorbing heat from the fire, will generate steam and emit it through the passage I. Each cubic foot of the steam, in traversing the layer of incandescent fuel, will be decomposed into a mixture consisting of one cubic foot of hydrogen and nearly an equal volume of carbonic oxide, with a small proportion of carbonic acid. Thus, one cubic foot of steam yields as much inflammable gas as five cubic feet of atmospheric air; but the one operation is dependent on the other, inasmuch as the passage of air through the fire is attended with the generation of heat, whereas the production of the water gases, as well as the evolution of the hydrocarbons, is carried on at the expense of heat. The generation of steam in the water-trough, being dependent on the amount of heat in the fire, regulates itself naturally to the requirement of the steam, the total production of combustible gases varying with the admission of air. Since the admission of air through the grate depends in its turn upon the withdrawal of the gases evolved in the producer, the production of the gases will be entirely regulated by the demand for them. As the gas may be produced in the furnace, it will escape therefrom through the opening H, which, if desirable, may be provided with a damper or gate.

We claim as our invention—

The gas-producer, constructed in manner and so as to operate substantially as described.

C. W. SIEMENS.
FREDERIC SIEMENS.

Witnesses to the signature of Charles William Siemens:
F. HELY,
J. H. KRÄUSSLACH.

Witnesses to the signature of Frederic Siemens:
H. BOËLIUS,
G. MEHLIX.